United States Patent
Stanimirovic et al.

(10) Patent No.: US 10,003,372 B2
(45) Date of Patent: Jun. 19, 2018

(54) COMBINATION MOBILE PHONE CASE AND ELECTRONIC CIGARETTE

(71) Applicant: Vaportronix, LLC, Bal Harbour, FL (US)

(72) Inventors: Steven Stanimirovic, Bal Harbour, FL (US); Jonathan Romero, Miami, FL (US)

(73) Assignee: Vaportronix, LLC, Aventura, FL (US)

( * ) Notice: Subject to any disclaimer, the term of this patent is extended or adjusted under 35 U.S.C. 154(b) by 0 days. days.

(21) Appl. No.: 15/640,179

(22) Filed: Jun. 30, 2017

(65) Prior Publication Data

US 2017/0302324 A1 Oct. 19, 2017

Related U.S. Application Data

(63) Continuation-in-part of application No. 15/465,559, filed on Mar. 21, 2017, which is a continuation-in-part of application No. 14/948,951, filed on Nov. 23, 2015, now Pat. No. 9,602,646, which is a continuation-in-part of application No. 14/604,303, filed on Jan. 23, 2015, now Pat. No. 9,197,726.

(60) Provisional application No. 61/933,091, filed on Jan. 29, 2014.

(51) Int. Cl.
| | | |
|---|---|---|
| H04M 1/00 | (2006.01) | |
| H04B 1/3888 | (2015.01) | |
| H04M 1/02 | (2006.01) | |
| H04B 1/3883 | (2015.01) | |
| A24F 47/00 | (2006.01) | |
| H01M 2/10 | (2006.01) | |

| | | |
|---|---|---|
| H02J 7/02 | (2016.01) | |
| H01M 10/42 | (2006.01) | |

(52) U.S. Cl.
CPC ......... *H04B 1/3888* (2013.01); *A24F 47/008* (2013.01); *H01M 2/1061* (2013.01); *H02J 7/025* (2013.01); *H04B 1/3883* (2013.01); *H04M 1/0274* (2013.01); *H01M 2010/4271* (2013.01); *H01M 2220/30* (2013.01)

(58) Field of Classification Search
CPC .... H04B 1/3888; H01M 2/1061; H02J 7/025; H04M 1/0274; A24F 47/008
USPC ...................................................... 455/575.8
See application file for complete search history.

(56) References Cited

U.S. PATENT DOCUMENTS

| | | | | |
|---|---|---|---|---|
| 8,831,698 B1 * | 9/2014 | Paulis | ................. | H04M 1/0254 |
| | | | | 379/440 |
| 9,197,726 B2 * | 11/2015 | Stanimirovic | ........ | H04M 1/215 |
| 9,433,242 B1 * | 9/2016 | Buffone | ................ | A24F 47/002 |

(Continued)

*Primary Examiner* — Sanh Phu
(74) *Attorney, Agent, or Firm* — Mark Terry

(57) ABSTRACT

A mobile phone case comprising a protective case element designed for coupling to a mobile phone with a first rechargeable battery, a wireless charging system embedded in the case element, a terminal conductively coupled with the wireless charging system, the terminal configured for conductively coupling with a power port in the mobile phone, an electronic cigarette element removably coupled to the case element, wherein when the terminal is conductively coupled with the power port in the mobile phone, and the case element is placed in proximity to a charging station, the wireless charging system charges the first rechargeable battery of the mobile phone and the second rechargeable battery of the electronic cigarette element.

18 Claims, 16 Drawing Sheets

(56) References Cited

U.S. PATENT DOCUMENTS

| | | | |
|---|---|---|---|
| 9,602,646 B2 * | 3/2017 | Stanimirovic | H04M 1/185 |
| 2013/0220315 A1 * | 8/2013 | Conley | A24F 47/008 |
| | | | 128/202.21 |
| 2015/0101940 A1 * | 4/2015 | Ash | H04M 1/21 |
| | | | 206/216 |
| 2016/0134142 A1 * | 5/2016 | Murphy | H02J 7/0054 |
| | | | 455/573 |
| 2016/0345628 A1 * | 12/2016 | Sabet | A24F 15/18 |
| 2017/0043998 A1 * | 2/2017 | Murison | B67D 7/36 |

* cited by examiner

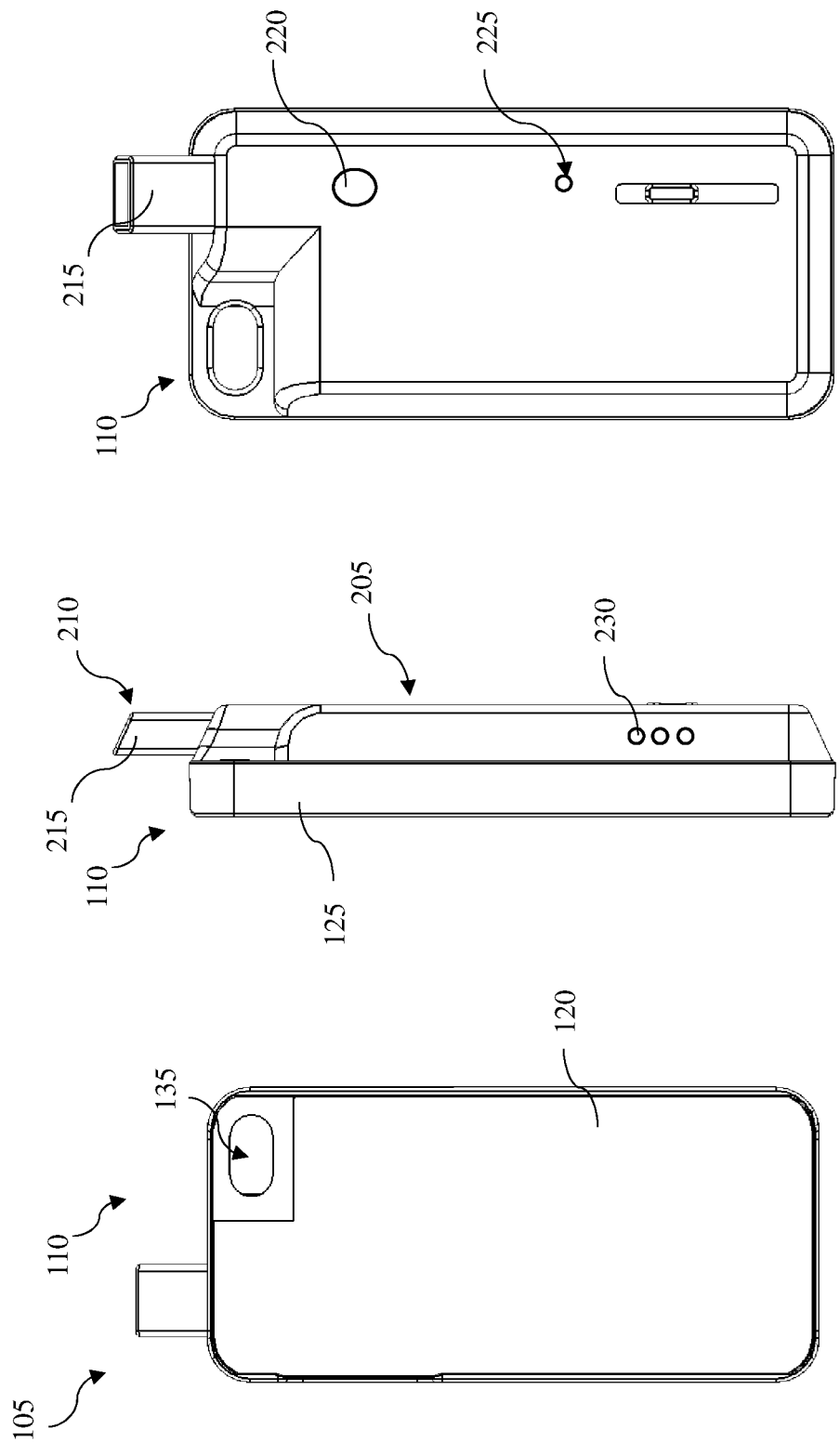

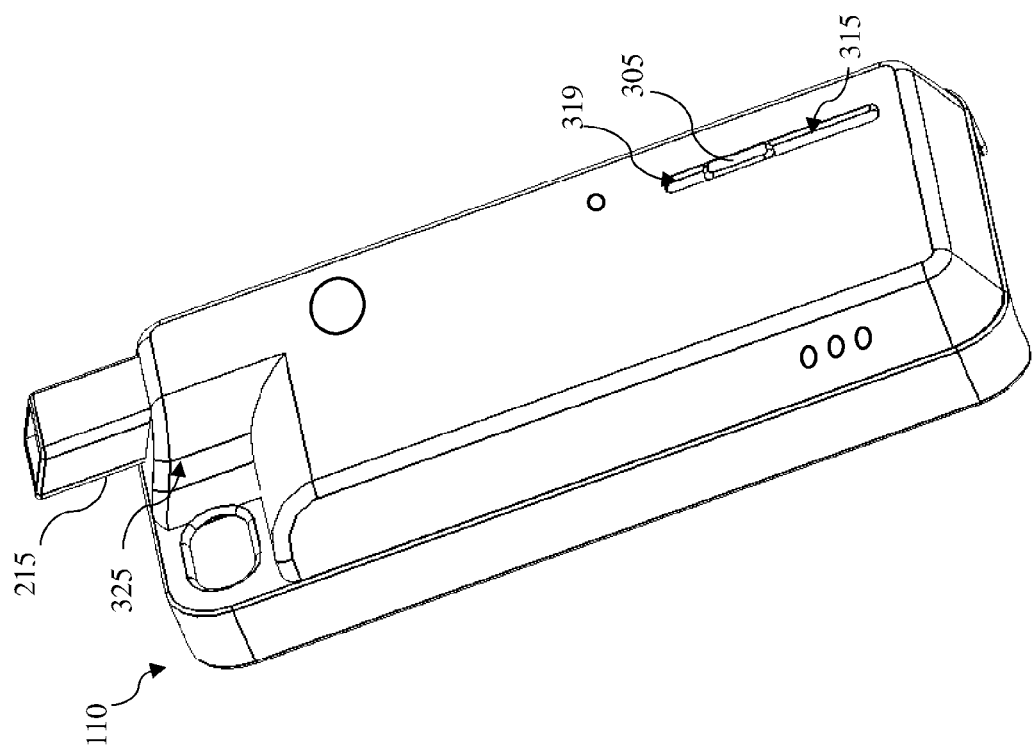

COMBINATION MOBILE PHONE CASE AND ELECTRONIC CIGARETTE

CROSS-REFERENCE TO RELATED APPLICATIONS

This patent application is a continuation in part of patent application Ser. No. 15/465,559 filed Mar. 21, 2017 and entitled "Combination Mobile Phone Case and Electronic Cigarette", which is a continuation in part of patent application Ser. No. 14/948,951 filed Nov. 23, 2015 and entitled "Combination Mobile Phone Case and Electronic Cigarette", which is a continuation in part of patent application Ser. No. 14/604,303 filed Jan. 23, 2015 and entitled "Combination Mobile Phone Case and Electronic Cigarette", which claims priority to provisional patent application No. 61/933,091 filed Jan. 29, 2014 and entitled "E-Cigarette in a Cell Phone Case". application Ser. Nos. 15/465,559, 14/948,951, 61/933,091 and 14/604,303 are hereby incorporated by reference in their entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The present invention relates to the field of mobile phones, and more specifically to the field of mobile phone cases.

BACKGROUND

Millions of people worldwide use mobile telephones for communication on a daily basis. It is well-known that mobile phones comprise components that can break or become damaged somewhat easily. As a result, many people choose to use a mobile phone case or cover to protect their mobile phones. Additionally, consumers may choose to use a mobile phone case for its decorative or aesthetic features. Mobile phone cases are available in various shapes and sizes and can be formed from various materials, such as plastic. Mobile phone cases are also designed with apertures for allowing a mobile phone to be connected to an external power source. Mobile phone cases may also be designed with various components that allow a user to push various buttons or controls on a telephone while the cover is on the phone. Moreover, some mobile phone cases include rechargeable batteries that provide power to the mobile phone.

Throughout history, consumers have enjoyed smoking tobacco cigarettes and the physiological and mental effects that nicotine has on an individual's body when smoking cigarettes or other nicotine and tobacco products. The health dangers associated with smoking tobacco cigarettes, however, have been well documented and include lung cancer, emphysema, etc. In recent years, many people have begun to smoke electronic cigarettes as a safer alternative to smoking tobacco cigarettes.

Most electronic cigarettes work the same way. An electronic cigarette includes a battery-powered heating element that atomizes a liquid solution into a vapor that a user can inhale into his lungs. Typically, the liquid solution can include a mixture of propylene glycol, glycerin, nicotine, flavorings, preservatives, other fillers and any combination thereof. Because of the decreased health dangers associated with smoking electronic cigarettes, this relatively new product has become very popular.

Many consumers who use mobile phones also use electronic cigarettes. One of the problems such people encounter is a lack of storage space necessary to hold both a mobile phone and an electronic cigarette at the same time. For example, a person may not have enough room in their pockets to store both a mobile phone and an electronic cigarette at the same time. Also, both a rechargeable phone case and an electronic cigarette require separate electrical cords, which can be cumbersome and cause clutter. Additionally, people with a tendency for losing items, may lose an electronic cigarette if it is not secured to another item. Furthermore, if a person uses a mobile phone covered by a mobile phone case and also smokes electronic cigarettes, that person currently has to purchase the mobile phone case and electronic cigarettes at different points in time. This can be time consuming and tedious As a result, there exists a need for improvements over the prior art and more particularly for a more efficient way to use both electronic cigarettes and mobile phone cases.

SUMMARY

A combination mobile phone case and electronic cigarette is disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a mobile phone case is disclosed. The mobile phone case comprises a protective case element designed for coupling to a mobile phone with a first rechargeable battery, a wireless charging system embedded in the case element, a terminal conductively coupled with the wireless charging system, the terminal configured for conductively coupling with a power port in the mobile phone, an electronic cigarette element removably coupled to the case element, wherein when the terminal is conductively coupled with the power port in the mobile phone, and the case element is placed in proximity to a charging station, the wireless charging system charges the first rechargeable battery of the mobile phone and the second rechargeable battery of the electronic cigarette element.

Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. The embodiments illustrated herein are presently preferred, it being understood, however, that the invention is not limited to the precise arrangements and instrumentalities shown, wherein:

FIG. 2A is a front view of the combination mobile phone case and electronic cigarette, according to an example embodiment;

FIG. 2B is a side view of the combination mobile phone case and electronic cigarette, according to an example embodiment;

FIG. 2C is a rear view of the combination mobile phone case and electronic cigarette, according to an example embodiment;

FIG. 4 is a rear perspective view of a combination mobile phone case and electronic cigarette in an assembled mode, according to an example embodiment;

DETAILED DESCRIPTION

Figures 1A, 1B:
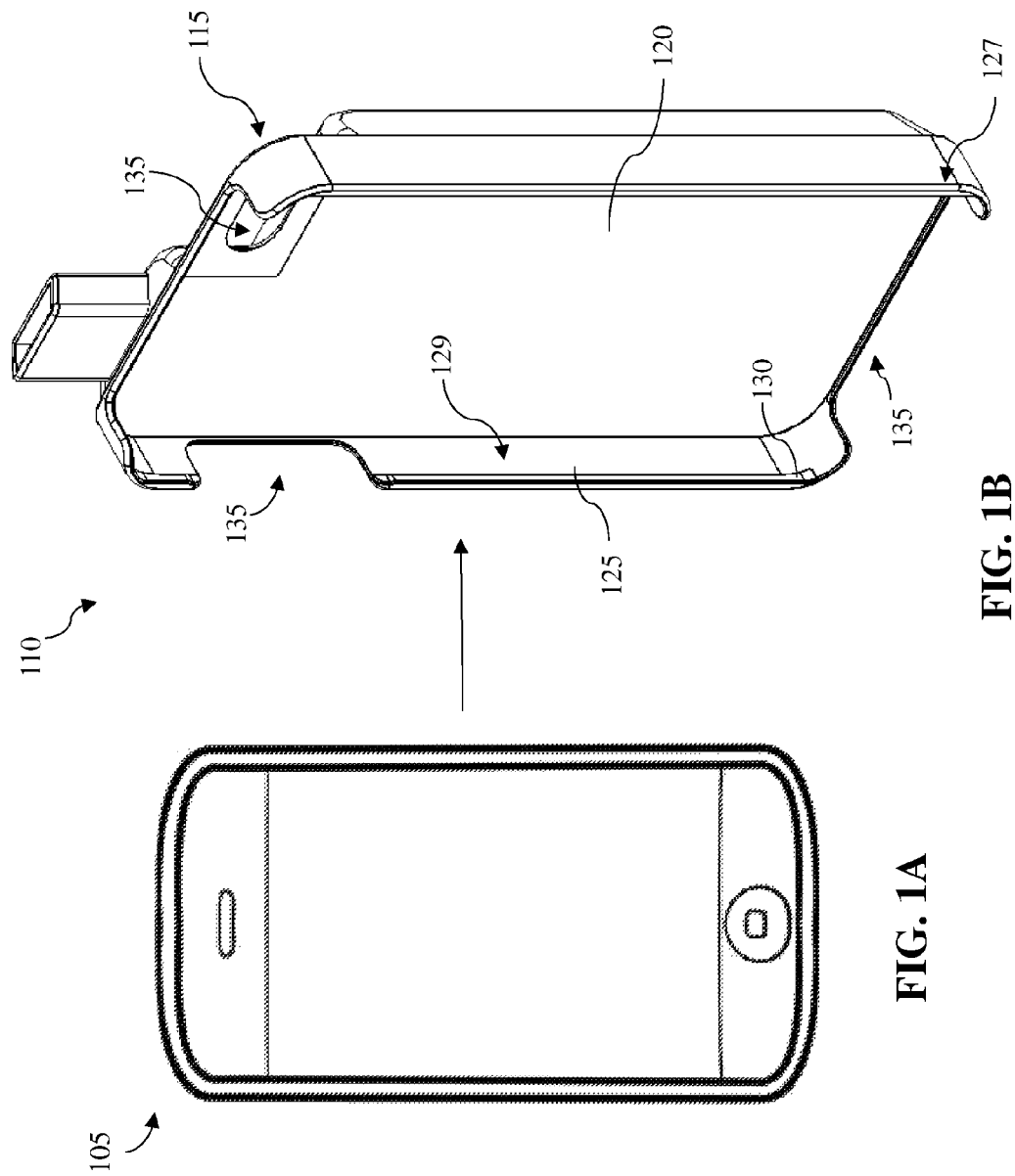
FIG. 1A is a front view of a mobile phone.
FIG. 1B is a front perspective view of a combination mobile phone case and electronic cigarette, according to an example embodiment.

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions or modifications may be made to the elements illustrated in the drawings, and the methods described herein may be modified by substituting reordering, or adding additional stages or components to the disclosed methods and devices. Accordingly, the following detailed description does not limit the disclosed embodiments. Instead, the proper scope of the disclosed embodiments is defined by the appended claims.

The disclosed embodiments improve upon the problems with the prior art by providing a mobile phone case having a protective case element and electronic cigarette elements embedded within the case. The disclosed embodiments allow for a single, integrated product that satisfies both the requirements of a rechargeable mobile phone case (that charges a mobile phone) and the requirements of an electronic cigarette in one unit, requiring only one electrical cord, and optionally sharing one rechargeable battery. The disclosed embodiments improve over the prior art by decreasing the amount of storage space required to store both an electronic cigarette and a cell phone, while also decreasing the number of electrical cords necessary for two separate electrical products. Additionally, the disclosed embodiments improve over the prior art by decreasing the amount of purchases that a user must complete in order to purchase both a mobile phone case and an electronic cigarette. Additionally, the disclosed embodiments improve over the prior art by decreasing the likelihood that a person with a tendency to lose things will lose or misplace an electronic cigarette and/or a mobile phone case.

Referring now to the Figures, FIG. 1A is an illustration of a front view of an example of a combination mobile phone case and electronic cigarette. Such mobile phone can be received by a mobile phone case 110 illustrated in FIG. 1B. FIG. 1B is a front perspective view of the combination mobile phone case and electronic cigarette, according to one embodiment. The mobile phone case comprises a protective case element 115 designed for coupling or covering the mobile phone. The purpose of the protective case element is to protect the phone from damage due to falls or mishandling of the mobile phone. The protective case element can be sized and designed to fully encase the cellular phone or said case element may be adapted to couple with the phone via a friction fit. In the present embodiment, the protective case element is designed for coupling to the mobile phone via a friction fit. In the present embodiment, the protective case element comprises a substantially planar rectangular shaped backing 120. Along the perimeter of the rectangular shaped backing is a wall element 125. The wall element has a substantially planar body and is attached along the perimeter of the backing and extends perpendicularly and distally from the surface of the rectangular shaped backing. The wall element has a top end 127 which has a catching feature 130 thereon. The catching feature forms a ridge that extends substantially perpendicularly inboard from the inner surface 129 of the top end of the wall element. The dimension between the catching features on the opposing wall elements is less than the dimension between the opposing wall elements. The material of the protective case is formed from a resilient material, such that forces acting outward may cause the catching features to be pushed outward, and after such forces are removed, the catching features will return back to its original shape.

Such resilient properties of the catching features allow a mobile phone to be inserted into the protective case element and retained by the catching features once in the protective case element. A cell phone 105 can be received by and held in place in the protective case element 115 via a friction fit. In the present embodiment, when a mobile or cellular phone is being positioned into the protective case element such that the back of a cellular phone abuts the backing 120, outward forces act on the resilient material of the inboard facing catching feature 130. This causes the dimension of the space between catching features on the opposing wall elements to increase to allow the mobile phone to pass into the protective case element. Once the cellular phone 105 is positioned in the protective case element, and outward forces acting on the catching feature of the wall section are removed, this causes the resilient material of the catching features to return to its original position and shape. After the material of the catching feature returns to its original shape, the catching feature facilitates maintaining the cellular phone within the protective case element. The protective case element is sized such that the surfaces of the cell phone fits snug with the inside surfaces of the protective case element when the phone is inside the protective case element. The protective case element may have a plurality of openings or apertures 135. These openings or apertures are positioned and correspond to the various components of the mobile phone, such as a camera lens, power ports, user controls, etc. and allow proper operation of the phone when inside the protective case element.

FIGS. 2A, 2B and 2C are front, side and rear views, respectively, of the combination mobile phone case and electronic cigarette, according to an example embodiment. FIGS. 2A and 2B further illustrate the backing 120 of the protective case along with the wall element 125 along the perimeter of the backing. FIG. 2B illustrates the housing or housing element 205 attached to a surface of the backing of the protective case element. The housing can be integral with the protective case element or in other embodiments may also be attached to the case element, using fasteners, glue, snapping features, etc. The housing is a rectangular shaped hollow body. A cavity is formed between the inside surface of the backing 120 and the inside surface (not shown) of the body of the housing that is adapted to encase or enclose an electronic cigarette, a battery and circuitry required to operate the electronic cigarette and to charge the mobile phone.

In one embodiment, a rechargeable battery (not shown) can be located within the housing and conductively coupled to a mobile phone power port (not shown). Rechargeable batteries are adapted and sized for being contained within the housing and are well known to those skilled in the art. The mobile phone power port can be positioned within the housing or proximate to the protective case element and is adapted for conductively coupling a mobile phone with the protective case element 115. Such mobile phone power port can be matched to fit the receiving power ports of cellular or mobile phones manufactured by a variety of different manufacturers. In one embodiment, the power port may be a USB charging port or other charging port well known to those skilled in the art. In operation, the mobile phone case may provide power to a mobile phone when a mobile phone is positioned within the protective case element and conductively coupled with the mobile phone power port, which is conductively coupled with the rechargeable battery.

In one embodiment, the mobile phone case also include an external power port (not shown) conductively coupled to the battery. The external power port is adapted for accepting power from an external power source or supply so as to recharge the battery. Such external power source or supply, may include line voltage, solar power, a rechargeable battery, etc.

An electronic cigarette element 210 (more fully described below and illustrated in FIG. 3) is retained or embedded within the housing. The electronic cigarette element can comprise components and functions similar to electronic cigarettes that are well known to those skilled in the art. The electronic cigarette element includes a heating element (not shown) conductively coupled to a rechargeable battery in the cigarette element 210 and/or the battery within the housing of the case 110. The heating element within the electronic cigarette is adapted for heating a liquid into vapor. Heating elements are well known to those skilled in the art and may be a coiled, wire, ribbon or straight heating element, comprising materials such as nichrome, nickel, chromium, resistance wire, etched foil, ceramic, composites, metal or any combination thereof. The electronic cigarette element also includes an extended hollow conduit 215, tubular element, or mouthpiece at one end of the electronic cigarette element and is shaped and sized for allowing a user to inhale vapor through the tubular element. The housing includes a housing opening 330 (illustrated in FIG. 3) on one end of the housing such that the conduit can extend through the body of the housing (or the entire cigarette element 210 can be removed via said opening 330). The housing opening is sized such that it closely fits around the conduit. The housing may also include at least one aperture 225 to act as a vent for allowing a flow of air between outside the housing and the electronic cigarette element. The aperture may be circle shaped however other shapes are also contemplated. In the present embodiment, one aperture or vent is illustrated, however additional vents in similar or other locations may also be used.

The housing may also include a vapor button 220. The vapor button is positioned such that when pressed it acts upon a portion of the electronic cigarette element, which in turn activates the heating element of the electronic cigarette element. The vapor button can be a push button or any small knob or disk that when pressed contacts a portion of the electronic cigarette element, which activates an electric circuit. In one embodiment, the electronic cigarette element 210 may be removably coupled to the housing so that a user may remove the electronic cigarette element completely from the body of the housing via opening 330. In this embodiment, the electronic cigarette may be retained within the housing by a friction fit and removed by applying sufficient forces to break the friction coefficient. In this embodiment, when the mouthpiece or conduit is in the extended position, a user can pull the electronic cigarette element out of the housing. Further, in this embodiment, the electronic cigarette element may include its own rechargeable battery, separate from battery 508, so as to power the electronic cigarette when removed from the housing. In another embodiment, the electronic cigarette element 210 may be retained within the housing by one or more magnets within the housing (or within the element 210) and removed by applying sufficient forces to break the force applied by the magnets. Said magnets hold the element 210 in place using magnetic force.

In one embodiment, the housing may also include LED lights 230. Such LED lights may indicate a level of battery charge remaining in the battery and/or electronic cigarette element and are conductively coupled to the battery and circuitry within the housing (further explained in FIG. 5A).

In one embodiment the electronic cigarette element is coupled to the housing 205 such that the conduit 215 can move between a retracted position (not shown) and an extended position (illustrated in the FIG. 2A-C). In the retracted position, the conduit or mouthpiece can be substantially or completely encased or covered by the housing. In the extended position, a portion of the conduit is not encased by the housing and extends beyond the surface of the body of the housing. In the retracted position, the conduit can be protected from the outside environment during and for storage when the electronic cigarette element is not in use. When in the extended position, a user can inhale vapor through the conduit or mouthpiece with his or her mouth. Recall that the electronic cigarette element 210 may include the conduit 215, as well as other components of the element 210.

In one embodiment (not shown), the electronic cigarette element can be mounted on a spring button mechanism (not shown) that is held within the housing. The spring button mechanism includes a tension spring and catching device within the housing that is adapted for moving the electronic cigarette between the retracted and extended positions. When in the retracted position and inboard forces act on a portion of the electronic cigarette, the tension spring, located at the end opposing the mouthpiece, is compressed releasing a catching device, such as a latch attached to the inside surface of the body of the housing, which allows the tension spring to expand and thereby moving the electronic cigarette into the extended position. When in the extended position and inboard forces act on the electronic cigarette, the tension spring is compressed and caught by the catching device retaining the tension spring in the compressed position and the electronic cigarette element in the retracted position.

In another embodiment, the electronic cigarette element is coupled to the housing 205 via a magnetic element. A magnetic element may comprise two components: 1) a magnet and 2) a ferrous metal component that is attracted to the magnet. In one embodiment, the housing includes a magnet and the electronic cigarette element 210 may include a ferrous metal component that is attracted to the magnet, such that the electronic cigarette element 210 is mounted or coupled to the housing. In another embodiment, the location of the magnet and the ferrous metal component is reversed. In yet another embodiment, two magnets are used instead.

Figure 3:
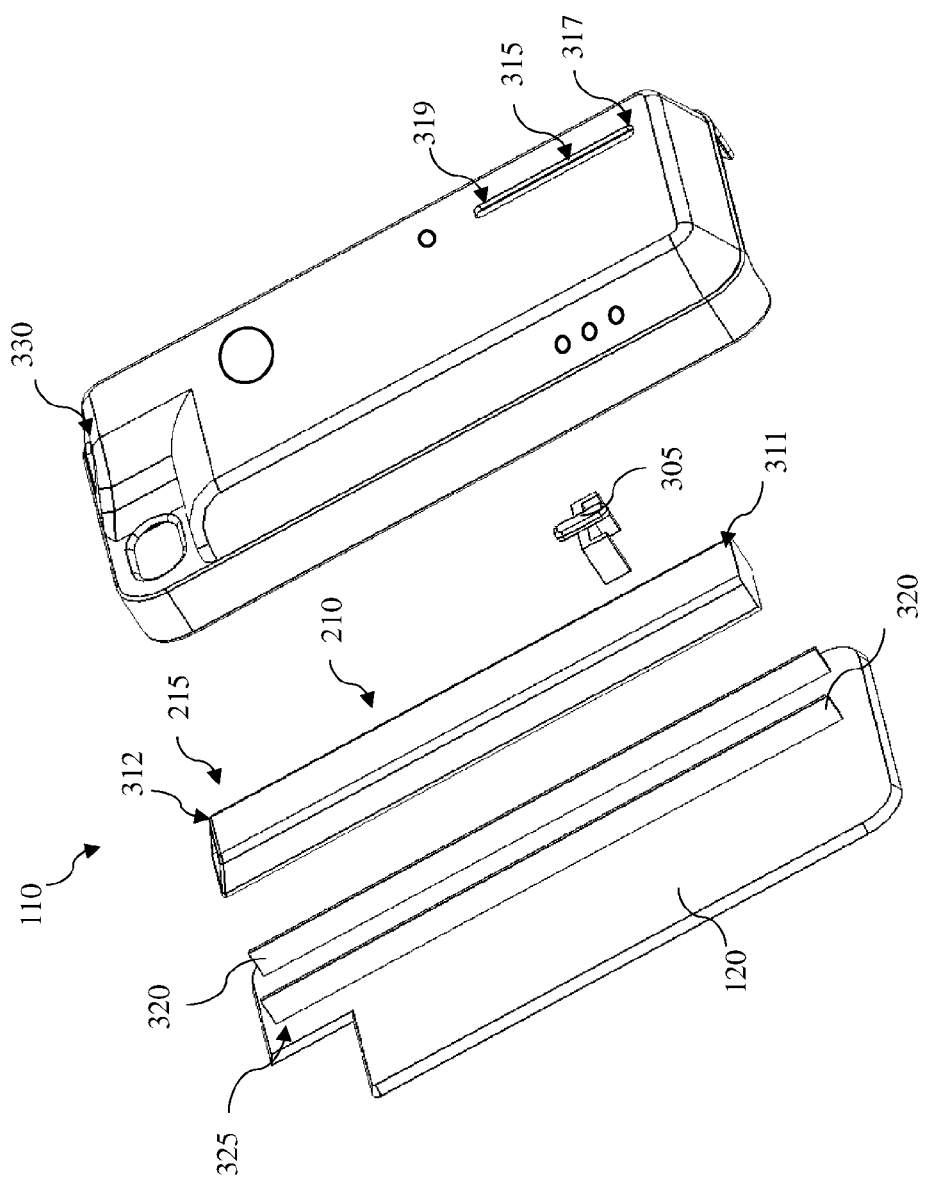
FIG. 3 is a partially exploded rear perspective view of the combination mobile phone case and electronic cigarette, according to an example embodiment.

FIG. 3 is an exploded side perspective view of the combination mobile phone case and electronic cigarette, according to one example embodiment. The electronic cigarette element 210 may be movably coupled to the housing by a sliding mechanism. FIG. 3 illustrates the components a sliding mechanism according to one example embodiment. The exploded view of FIG. 3 allows for an easier explanation of the components and functionality of the sliding mechanism. In the present embodiment, the sliding mechanism comprises a tab 305 that, when fully assembled, is affixed to cigarette element 210. In the present embodiment, the tab is a rectangular shaped body attached to a U-shaped member that is affixed to the cigarette element 210, however other embodiments are contemplated and within the spirit of the invention.

In the present embodiment, the electronic cigarette element 210 comprises conduit 215 having a first end 311 opposing a second end 312. The tab is affixed to the cigarette element 210 for moving the cigarette element 210 between the retracted and extended positions. In the present embodiment, the tab is positioned near the first end of the cigarette element 210, however, the tab may be positioned at other locations along the body of the cigarette element 210 so that forces acting on the tab can move the cigarette element 210 between the extended and retracted positions. The siding mechanism also includes an elongated slot 315 along a portion of the housing and is sized and adapted for receiving the tab 305. The slot 315 is an elongated rectangular shaped opening having a first end 317 opposing a second end 319.

A pair of opposing elongated rails 320 is affixed to a portion of the backing 120 of the protective case element. However, in other embodiments, the rails may be affixed to the inside surface (not shown) of the body of the housing. In the present embodiment, each elongated rail is an elongated rectangular shaped body and the rails are positioned far enough apart so that cigarette element 210 may be positioned between the rails such that the rails retain the cigarette element 210 within a first portion 325 of the housing.

FIG. 4 is a rear perspective view of the combination mobile phone case and electronic cigarette, according to an example embodiment. FIG. 4 illustrates the sliding mechanism fully assembled. When fully assembled, the cigarette element 210 is positioned between the rails (illustrated in FIG. 3) in the first portion 325 of the housing and the tab is affixed proximate to the first end of the cigarette element 210. The tab is received by the elongated slot 315 along the body of the housing and extends beyond the surface of the body of the housing such that a user can use the tab to slide or translate the electronic cigarette element between the extended and retracted positions by applying forces on the tab. FIG. 4 also illustrates the conduit 215 or tubular element of the electronic cigarette in the extended position. In the extended position, the tab 305 is proximate to the second end 319 of the elongated slot 315 thereby causing a portion of the tubular element or mouthpiece to extend beyond the body of the housing. In the extended position the conduit 215 or mouthpiece extends beyond the body of the housing so as to allow the user to orally inhale vapor through the mouthpiece with his or her mouth. The conduit 215 may have a circular, rectangular, triangular, etc. cross section.

An electronic cigarette element may have a component, such as a transparent cartridge, that allows a user to determine the amount of liquid held within the electronic cigarette. In such cases, the housing may also include a second portion (not shown) that is comprised of a transparent or translucent material, such as a polycarbonate, that aligns with such transparent cartridge and allows a user to visually determine the amount of liquid within the electronic cigarette element.

Figure 5A:
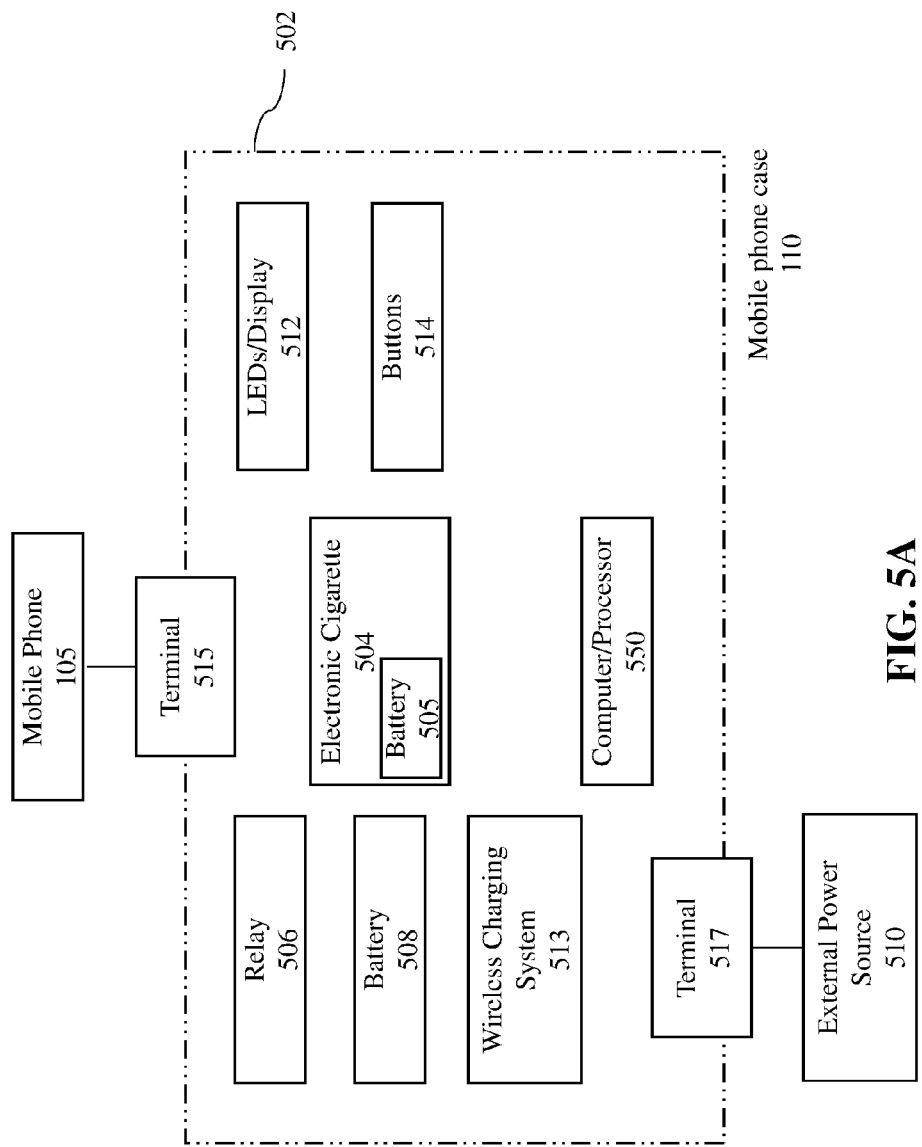
FIG. 5A is a block diagram illustrating components of the combination mobile phone case and electronic cigarette, according to an example embodiment.

Also retained within the housing 205 is a processor or computer (illustrated in FIG. 5A). Such processor is configured for routing power from the battery of the case 110 to the mobile phone via the power port and/or into the heating element of the electronic cigarette element 210. The processor may be programmed in various fashions to allow for a variety of combinations of distribution of power to the mobile phone and to the electronic cigarette element, as described more fully below.

The various components of the protective case element and housing element may be comprised of materials such as plastics, rubberized plastic, silicone, water resistant material, resilient material, silicone, rubber, leather, etc. The various components of the mobile phone case can be separate and be may be affixed with glue, acrylic glue, fasteners, snaps etc. or the components may be integral with one another.

FIG. 5A is a block diagram illustrating components of the combination mobile phone case and electronic cigarette, according to an example embodiment. The components within hashed line 502 are the components included in the mobile phone case 110. The components within the case can be conductively coupled with conductors, such as solder, wire, etc. The components within hashed line 502 are a non-limiting embodiment and other components may also be included and different arrangements of the components are contemplated and are consistent with the spirit of the invention.

External power source 510 is conductively coupled, and provides power, to an external terminal 517, which is conductively coupled to other components of the case 110, such as rechargeable battery 508. The terminal 517 is the point at which a conductor from case 110 comes to an end and provides a point of connection to external circuits. A terminal may simply be the end of a wire or it may be fitted with a connector or fastener. The terminal may be a male jack, male connector, a female jack, a female connector, a USB connector. The terminal may be any plug or connector that is used to transfer data and/or electrical current. The terminal may also be a magnetic terminal, which may be a magnetically attached power or data connector. The magnetic terminal is held in place magnetically so that if it is tugged, it will pull out of the connection without damaging the components, the case or the phone. Magnets may be placed within the connector and arranged in opposing polarities for improved coupling strength. The terminal may also be referred to as a power port, plug, jack or connector.

The external power source can be a DC or AC power source or power supply, such as a rechargeable solar powered battery, battery, line voltage, etc. The rechargeable battery 508 can be a single battery or a plurality of conductively coupled batteries, wherein each battery can comprise a variety of configurations or arrangements, such lead-acid, nickel cadmium (NiCd), nickel metal hydride (NiMH), lithium ion (Li-ion), and lithium ion polymer (Li-ion) polymer or any combination thereof. The rechargeable battery 508 may be removable in the same manner in which rechargeable batteries are removable from appliances, as is well known win the art. FIG. 5C shows how the rechargeable battery 592 in case 590 is removable from the case 590.

In one embodiment, the case 110 supports wireless charging, otherwise known as inductive charging. In this embodiment, the external power source 510 wirelessly provides power to the battery 508 of the case 110 using wireless charging. In this embodiment, the case 110 would include a wireless charging system 513 (well known in the art) that includes an induction coil that interacts with an induction coil associated with the external power source, so as to execute inductive charging.

FIG. 5A also shows electronic cigarette 504, which may comprise all components referred to previously as electronic cigarette element 210. As explained above, in one alternative, electronic cigarette 504 may include its own removable rechargeable battery 505 apart from battery 508. In this alternative, the battery 505 is used to power the heating element of the cigarette element 210, especially when the cigarette element has been removed from the case 110.

The case 110 also includes a battery 508 conductively coupled to a relay 506, such a solid-state switch. The relay is used to electromechanically control the flow of power from the battery 508 to the mobile phone 105 and electronic cigarette 504. The heating element of the electronic cigarette may be conductively coupled to the battery 508 (via relay 506) such that when the system allows power from the battery 508 to be received by the heating element, the heating element heats the liquid within the electronic cigarette and turns the liquid into a vapor. Also, the battery 505 of the electronic cigarette may be conductively coupled to the battery 508 (via relay 506) such that when the system allows power from the battery 508 to be received by the battery 505 so as to recharge battery 505.

Likewise, the mobile phone 105 is conductively coupled to the battery 508 (via relay 506) such that when the system allows power from the battery 508 to be received by the mobile phone, the mobile phone is powered by the battery 508 or the battery within the mobile phone 105 is recharged by the battery 508. (Note that in one embodiment, the phone 105 is not conductively coupled to the case 110 via a wire.) In one embodiment, the processor 550 collects data from the electronic cigarette 504, such as the state or charge level of the battery 505 within cigarette 504, and also from the phone 105, such as the state or charge level of the battery within phone 105. In this embodiment, based on the data received from cigarette 504 and the phone 105, the processor 505 determines to which unit power will be routed from the battery 508. If the battery within phone 105 is depleted or more depleted than the battery 505 of cigarette 504, then the processor 550 commands relay 506 to route power from battery 508 to the battery 505. If the battery within cigarette 504 is depleted or more depleted than the battery of phone 105, then the processor 550 commands relay 506 to route power from battery 508 to the battery within cigarette 504. In another embodiment, the processor 550 commands relay 506 to route partial power from battery 508 to the battery 505 within cigarette 504 and partial power from battery 508 to the battery within phone 105. In yet another embodiment, the processor 550 commands relay 506 to route power from the battery of phone 105 to the battery 508, and/or the battery 505 within cigarette 504. In yet another embodiment, the processor 550 commands relay 506 to route power from the battery of phone 105 and/or the battery 508, directly to the heating element within cigarette 504, bypassing the battery 505.

Note that in one embodiment, the phone 105 is not conductively coupled to the case 110 via a wire. In a related embodiment, the phone 105 supports wireless charging of its battery (which would require an induction coil in the phone 105). Likewise, in a previously discussed embodiment, the case 110 supports wireless charging of its battery 508 by an external power source 510. In yet another embodiment, the invention supports wireless charging of the battery 505 by the battery 508 using inductive coupling. In this embodiment, the electronic cigarette 504 would include an induction coil that interacts with an induction coil associated with the case 110, so as to execute inductive charging. In a further embodiment, the invention supports wireless charging of the battery of phone 105 by the battery 508 using inductive coupling.

A communications bus may connect the components within the housing and provides communication of data among the components of the circuit. The bus also provides communication between the case 110 and the mobile phone 105, as well as the cigarette 504. Also included in the circuit within case 110 is LEDs/display 512. LEDs lights can be located on the body of the housing for indicating the amount of power remaining in the battery and/or electronic cigarette. The LEDs can be different colors and sizes and various combinations of colors can indicate varying levels of charge remaining in the battery. A graphical user interface (or simply user interface) or display may also be used for indicating the level of power as well as other parameters and settings associated with the electronic cigarette. For example, said user interface may be used to prompt the processor 550 (in response to user input) to route power between the battery of the mobile phone 105, the battery 508 of the case, the battery 505 of the electronic cigarette element and the heating element of the electronic cigarette element, as defined more fully below. Buttons 514 can be a push button or any small knob or disk that when pressed activates an electric circuit and is connected to the bus and can be used to open or close the electrical circuit when the button or knob is depressed. The buttons can be used for powering on and off the device as well as for adjusting the settings and parameters of the mobile phone case 100 and electronic cigarette 504, as well as power routing functions, as defined more fully below.

Processor 550 is used to control, through the communications bus, functions including the opening and closing of the relay switch to route the power from the rechargeable battery to the mobile phone power port and to the battery 505 or heating element of the electronic cigarette element and to control the LEDs and/or graphical user interface display. Processor 550 could be any type of processor such as a microcontroller, a programmable logic controller or an ASIC (Application Specific Integrated Circuit).

Figure 5B:
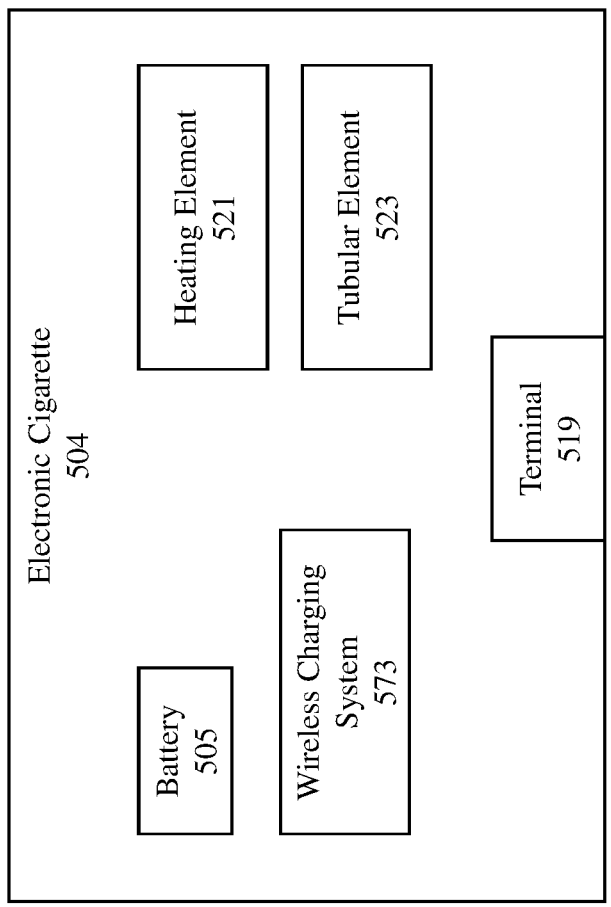
FIG. 5B is a block diagram illustrating components of the electronic cigarette, according to an example embodiment.
Figure 5C:
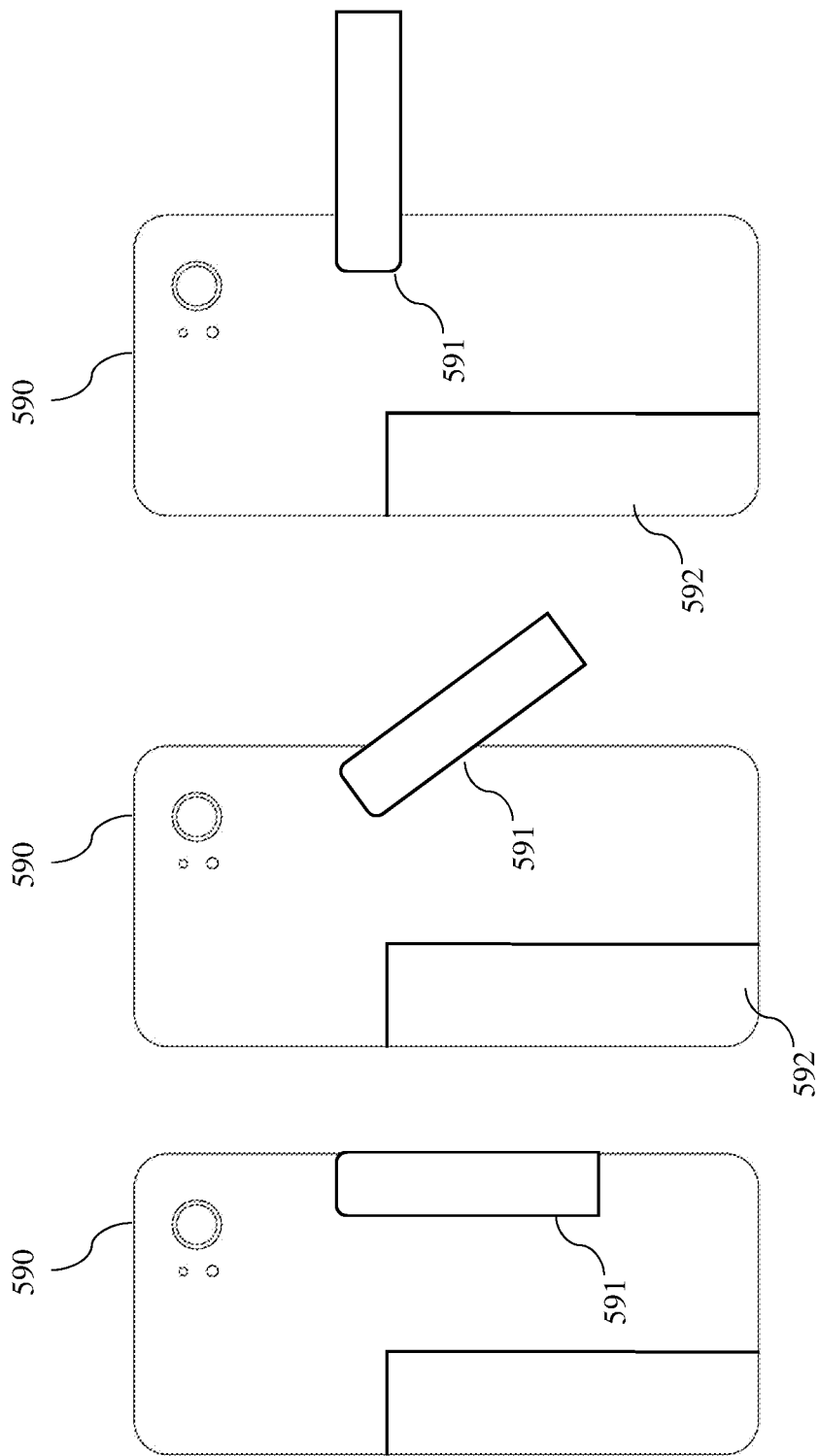
FIG. 5C is a block diagram illustrating uses of a rotatable tubular element of the electronic cigarette, according to an example embodiment.

FIG. 5B is a block diagram illustrating components of the electronic cigarette 504, according to an example embodiment, which may comprise all components referred to previously as electronic cigarette element 210. As explained above, in one alternative, electronic cigarette 504 may include its own removable rechargeable battery 505. In this alternative, the battery 505 is used to power the heating element of the cigarette element, especially when the cigarette element has been removed from the case 110. In one embodiment, the electronic cigarette 504 would include a wireless charging system 573 (well known in the art) that includes an induction coil that interacts with an induction coil associated with an external power source (or wireless charging system 513 on the case 110), so as to execute inductive charging. The heating element 521 of the electronic cigarette may be conductively coupled to the battery 505 such that when the system allows power from the battery to be received by the heating element, the heating element heats the liquid within the electronic cigarette and turns the liquid into a vapor.

Electronic cigarette 504 may external terminal 519, which is conductively coupled to other components of the cigarette 504, such as rechargeable battery 505. The terminal 519 is the point at which a conductor from cigarette 504 comes to an end and provides a point of connection to external circuits. A terminal may simply be the end of a wire or it may be fitted with a connector or fastener. The terminal may also be a magnetic terminal.

FIG. 5C is a block diagram illustrating uses of a rotatable tubular element of the electronic cigarette, according to an example embodiment. The rotatable tubular element 591 of the electronic cigarette is rotatably attached on one end to one embodiment of the phone case, indicated as case 590 in FIG. 5C. In this embodiment, electronic cigarette element includes an extended hollow conduit 591, the tubular element, that includes a mouthpiece at one end and is shaped and sized for allowing a user to inhale vapor through the tubular element.

The rotatable tubular element 591 is rotatably attached on one end to case 590, such that the tubular element may rotate about the end that is connected, much like a door swings about a hinge. The other end of the tubular element includes a mouthpiece at one end and is shaped and sized for allowing a user to inhale vapor through the tubular element. The left drawing of FIG. 5C shows that the tubular element 591 is rotated such that the longitudinal axis of the tubular element is parallel with the side of the case 590. The middle drawing of FIG. 5C shows that the tubular element 591 is rotated such that the longitudinal axis of the tubular element is at a roughly 45-degree angle with the side of the case 590. The right drawing of FIG. 5C shows that the tubular element 591 is rotated such that the longitudinal axis of the tubular element is perpendicular to the side of the case 590, which allows the user access to the mouthpiece at the distal end and allows the user to inhale vapor through the tubular element.

Figure 7:
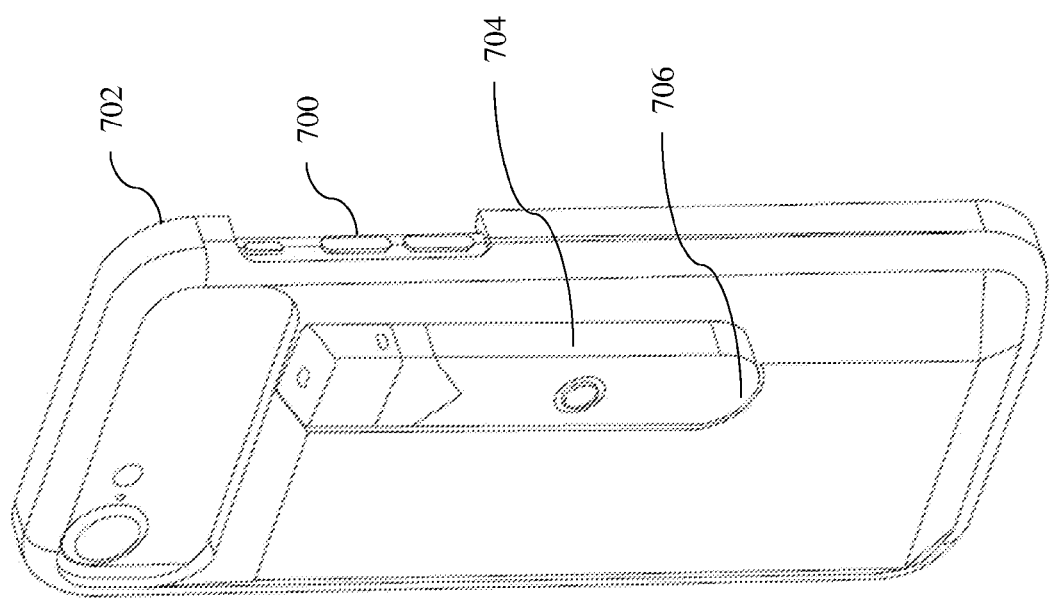
FIG. 7 is an illustration of another embodiment of a mobile phone case combined with an electronic cigarette.

FIG. 7 is an illustration of another embodiment of a mobile phone case combined with an electronic cigarette. FIG. 7 shows that the mobile phone case 702 has been coupled to the mobile phone 700 via a friction fit. The mobile phone case 702 includes an electronic cigarette element 704 that has been pivotally attached to the mobile phone case 702 such that the electronic cigarette element 704 may rotate about a pivot point 706. In FIG. 7, the electronic cigarette element 704 has not been rotated and the longitudinal axis of the electronic cigarette element 704 is parallel to the longitudinal axis of the mobile phone case 702.

Figure 8:
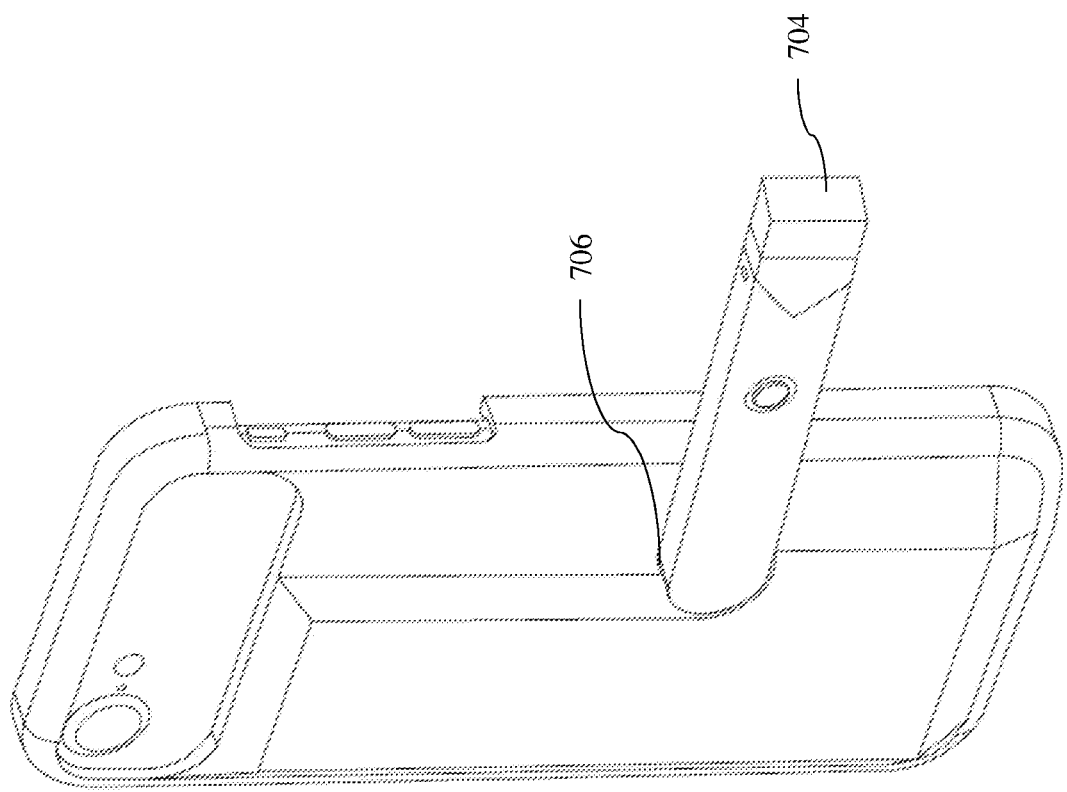
FIG. 8 is another illustration of the mobile phone case of FIG. 7.

FIG. 8 is another illustration of the mobile phone case of FIG. 7. FIG. 8 shows that the electronic cigarette element 704 has rotated about a pivot point 706 such that the longitudinal axis of the electronic cigarette element 704 is perpendicular to the longitudinal axis of the mobile phone case 702. This arrangement allows the user to more easily inhale from the distal end of the electronic cigarette element 704.

Figure 9:
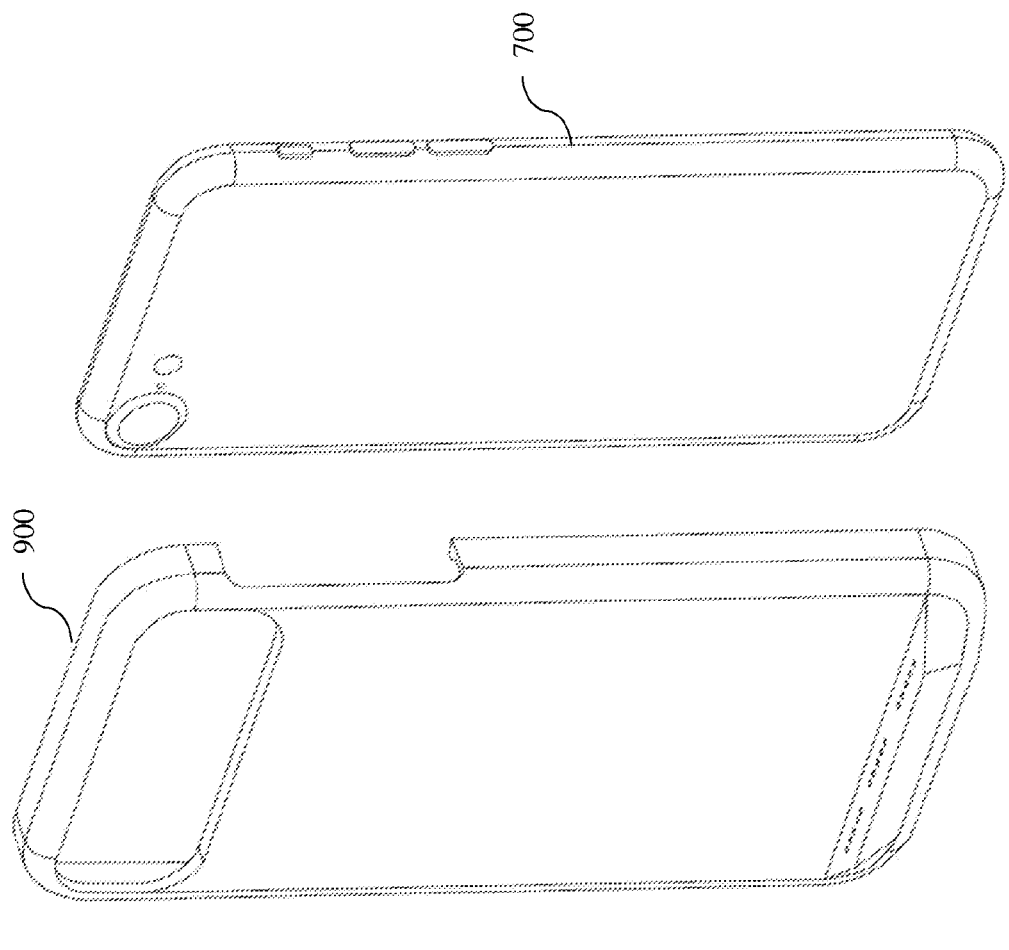
FIG. 9 is an illustration of yet another embodiment of a mobile phone case, with modular features.

FIG. 9 is an illustration of yet another embodiment of a mobile phone case, with modular features. FIG. 9 shows that the mobile phone case 900 is about to be coupled to the mobile phone 700 via a friction fit.

Figure 10:
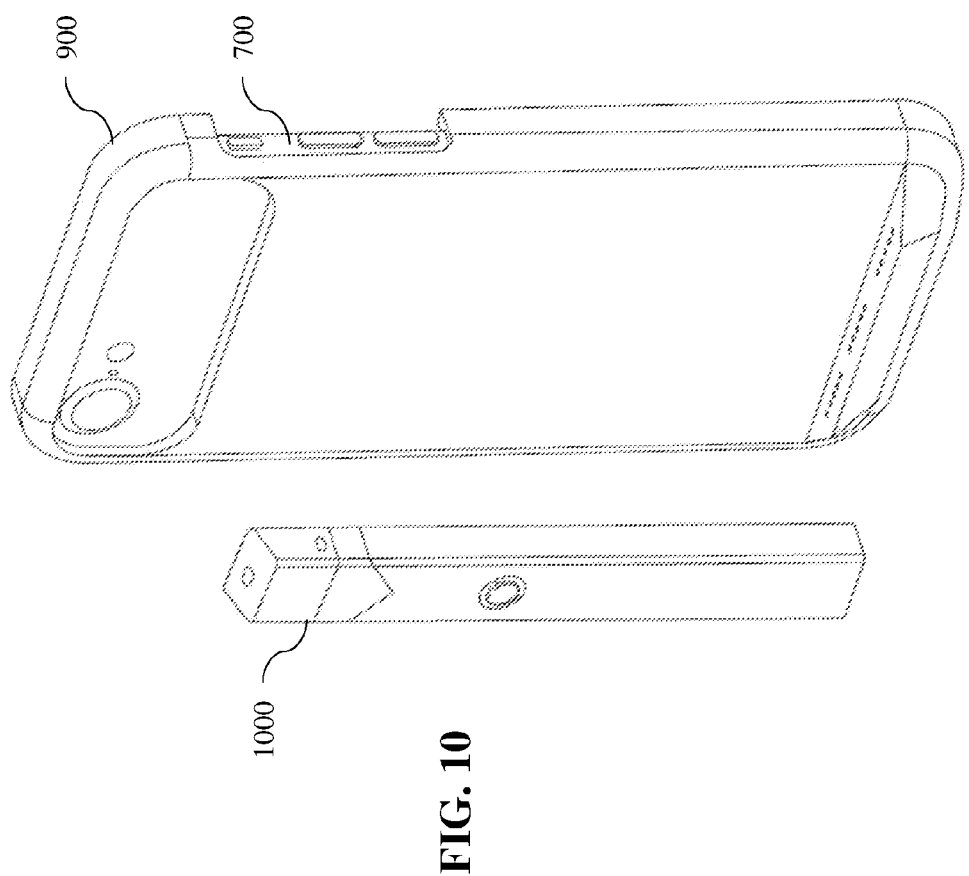
FIG. 10 is another illustration of the mobile phone case of FIG. 9, shown in conjunction with an electronic cigarette element.

FIG. 10 is another illustration of the mobile phone case of FIG. 9, shown in conjunction with an electronic cigarette element. FIG. 10 shows that the mobile phone case 900 has been coupled to the mobile phone 700 via a friction fit. The mobile phone case 900 may be coupled with an electronic cigarette element 1000 that may be magnetically attached to the mobile phone case 900 via a magnetic element. In FIG. 10, the electronic cigarette element 1000 is an independent and separate element with a longitudinal axis parallel to the longitudinal axis of the mobile phone case 900.

Figure 11:
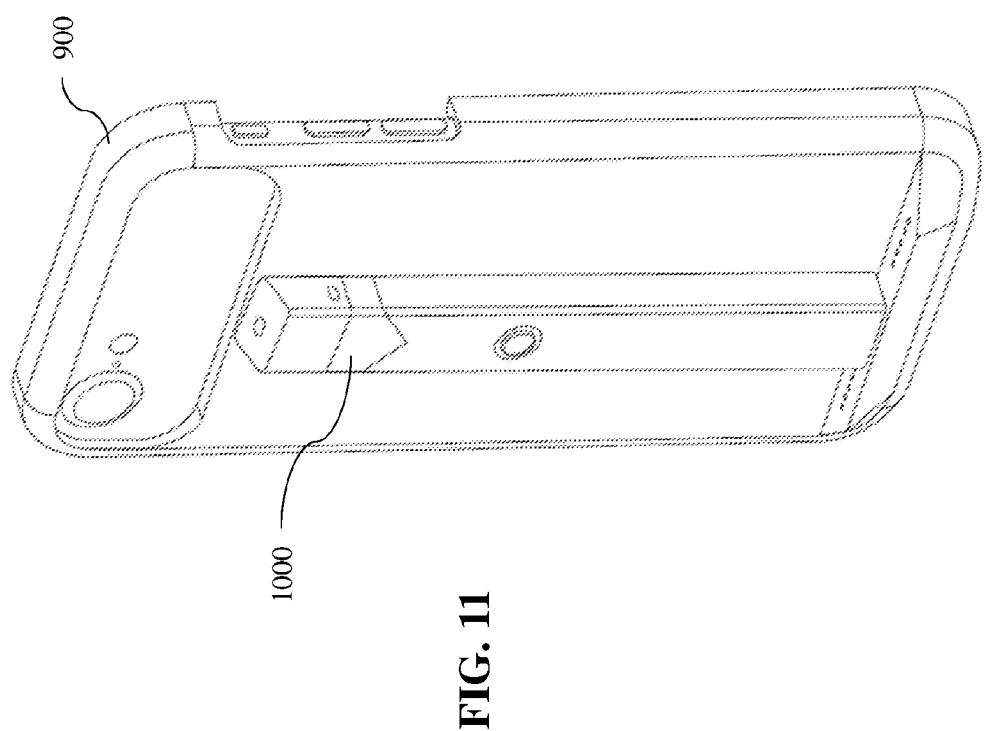
FIG. 11 is another illustration of the mobile phone case of FIG. 9, with an attached electronic cigarette element.

FIG. 11 is another illustration of the mobile phone case of FIG. 9, with an attached electronic cigarette element. FIG. 11 shows that the mobile phone case 900 has been coupled with the electronic cigarette element 1000 via a magnetic element. In FIG. 11, the electronic cigarette element 1000 is removably coupled to the mobile phone case 900 such that the longitudinal axis of the cigarette element is parallel to the longitudinal axis of the mobile phone case 900. In one embodiment, the mobile phone case 900 is removably coupled with the electronic cigarette element 1000 via a magnetic element that allows the cigarette element to be decoupled from the mobile phone case using regular human finger strength or grip strength.

Figure 12:
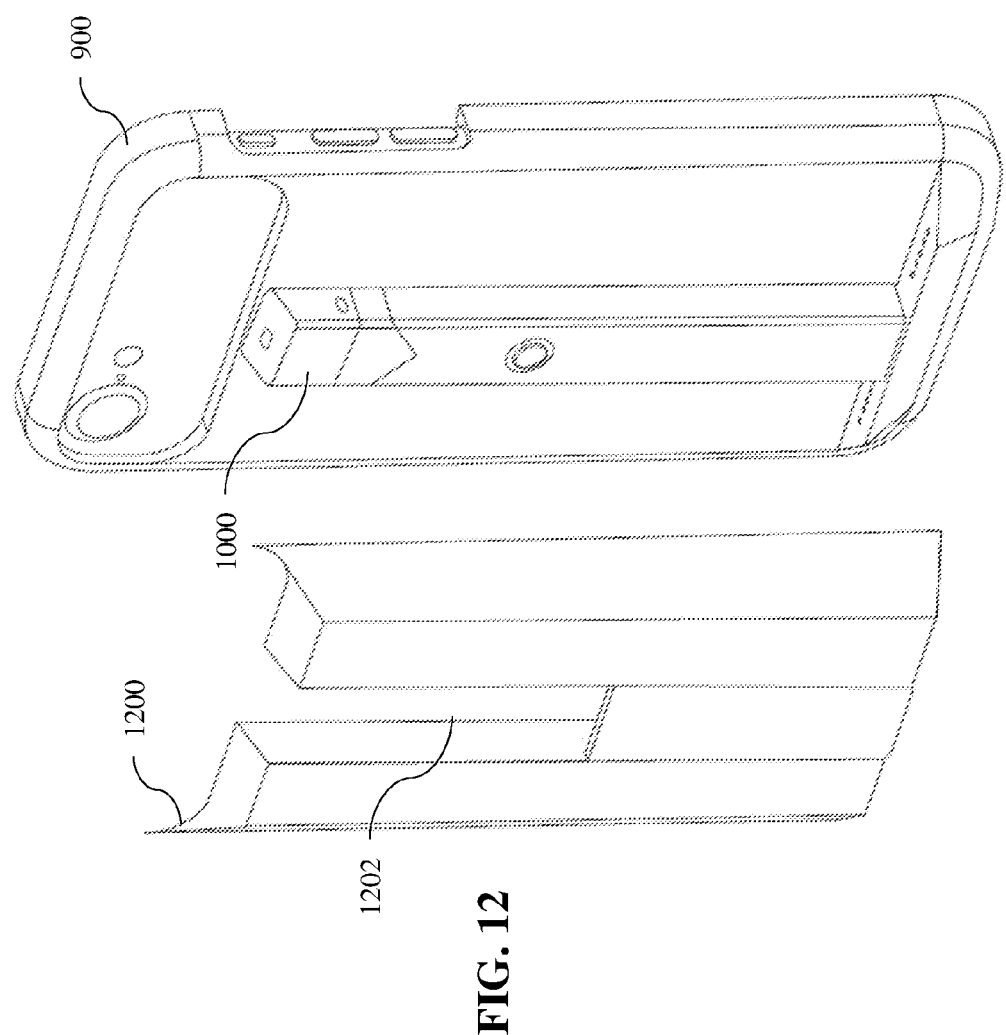
FIG. 12 is another illustration of the mobile phone case of FIG. 9, shown in conjunction with a removable battery pack.

FIG. 12 is another illustration of the mobile phone case of FIG. 9, shown in conjunction with a removable battery pack. FIG. 12 shows that a battery pack 1200 is about to be removably coupled to the mobile phone case 900 via a magnetic element. FIG. 12 also shows a channel or gutter 1202 located in the battery pack 1200, which is shaped and configured to allow for the electronic cigarette element 1000 to be securely inserted into the channel or gutter 1202.

Figure 13:
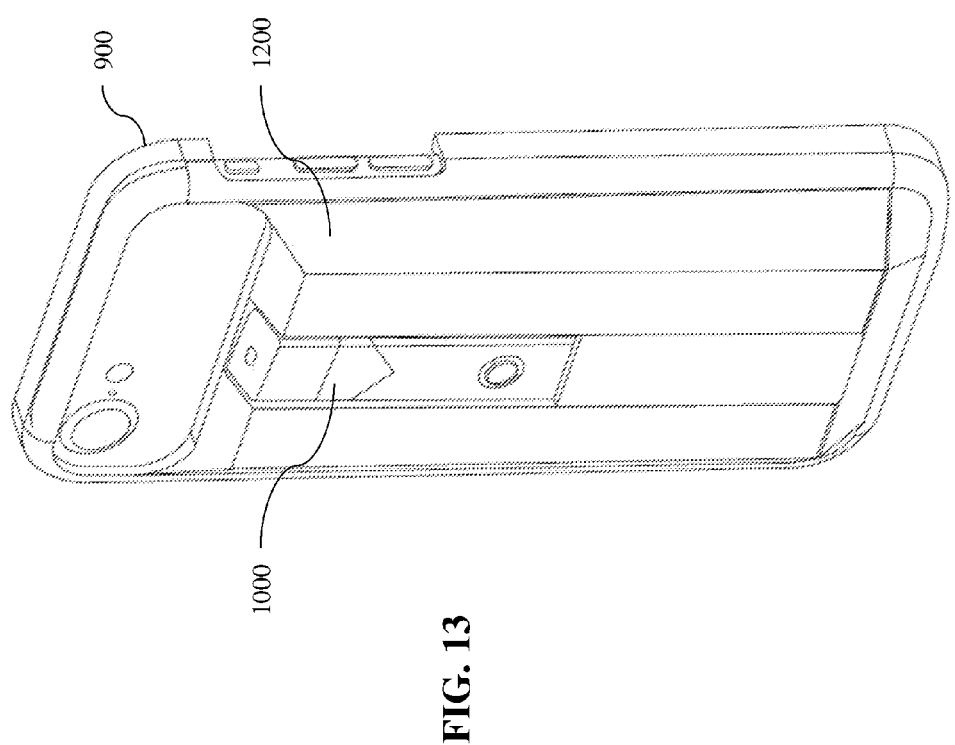
FIG. 13 is another illustration of the mobile phone case of FIG. 9, shown with an attached battery pack.

FIG. 13 is another illustration of the mobile phone case of FIG. 9, shown with an attached battery pack. FIG. 13 shows that the battery pack 1200 has been coupled to the mobile phone case 900 via a magnetic element. In FIG. 13, the battery pack 1200 is an independent and separate element with a longitudinal axis parallel to the longitudinal axis of the mobile phone case 900. Note in FIG. 13 that the electronic cigarette element 1000 has been securely inserted into the channel or gutter 1202. The battery pack 1200 may provide battery power to the cigarette element 1000 via a terminal connection or wirelessly through a wireless charging system. The battery pack 1200 may also provide battery power to the mobile phone 700 via a terminal connection or wirelessly through a wireless charging system.

Figure 14:
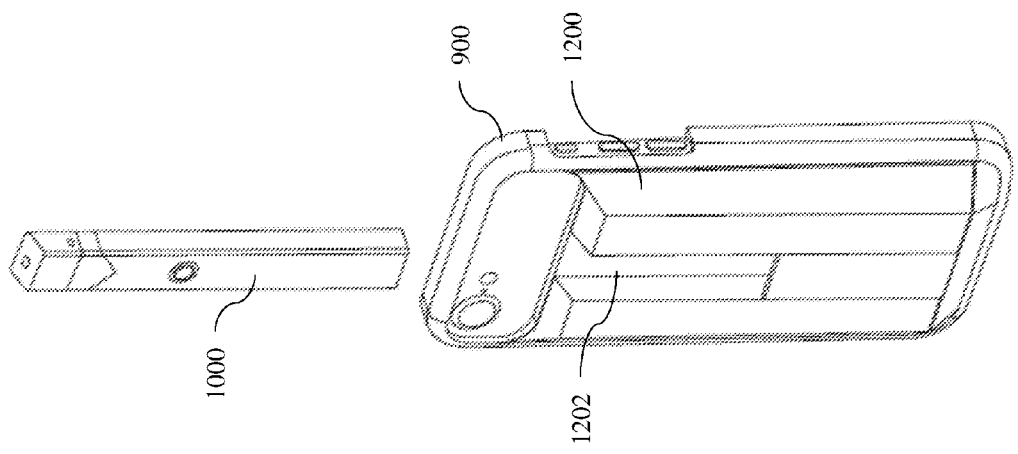
FIG. 14 is another illustration of the mobile phone case of FIG. 9, also shown with an attached battery pack.

FIG. 14 is another illustration of the mobile phone case of FIG. 9, also shown with an attached battery pack. FIG. 14 shows that the battery pack 1200 has been coupled to the mobile phone case 900 and that the electronic cigarette element 1000 has been entirely removed from the channel or gutter 1202 in the battery pack 1200. This arrangement allows the user to more easily utilize the electronic cigarette element 1000 for inhaling vapor.

Figure 6:
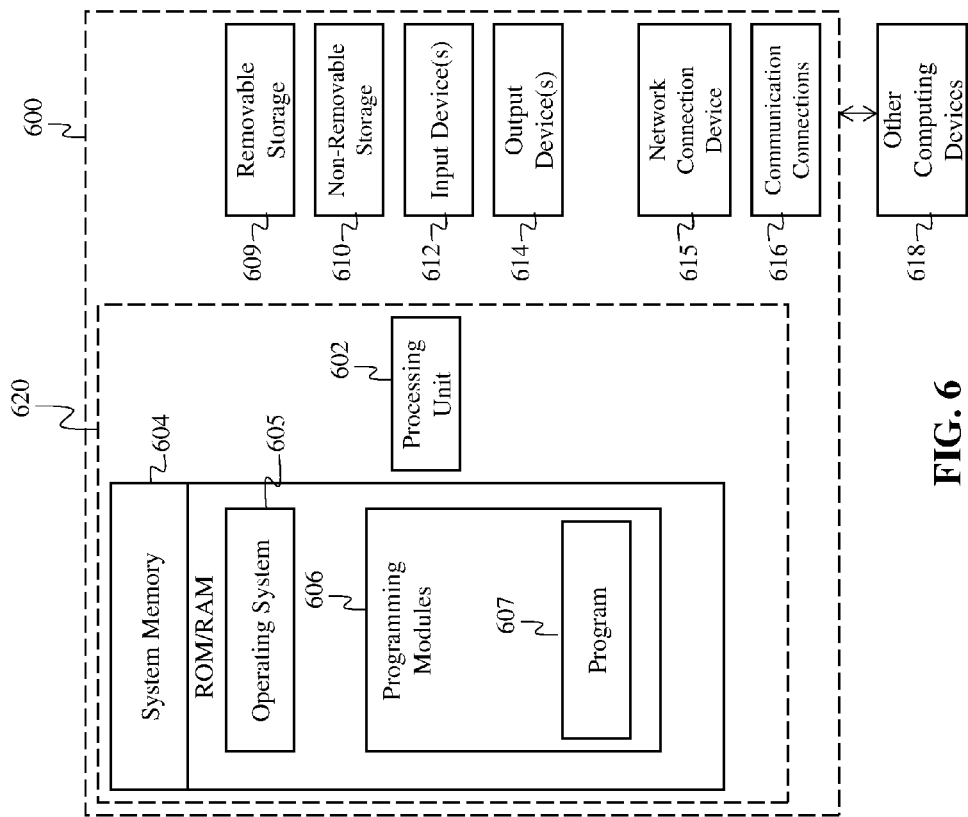
FIG. 6 is a block diagram of a computing device, according to an example embodiment.

FIG. 6 is a block diagram of a system including an example computing device or computer/processors 600. Consistent with the embodiments described herein, the aforementioned actions performed by computer/processor 550 may be implemented in a computing device, such as the computing device 600 of FIG. 6. Any suitable combination of hardware, software, or firmware may be used to implement the computing device 600. The aforementioned system, device, and processors are examples and other systems, devices, and processors may comprise the aforementioned computing device. Furthermore, computing device 600 may comprise an operating environment for performing the processing functions described as described above. Additionally, the computer/processor 550 may operate in other systems and are not limited to computing device 600.

With reference to FIG. 6, a system consistent with an embodiment of the invention may include a plurality of computing devices, such as computing device 600. In a basic configuration, computing device 600 may include at least one processing unit 602 and a system memory 604. Depending on the configuration and type of computing device, system memory 604 may comprise, but is not limited to, volatile (e.g. random access memory (RAM)), non-volatile (e.g. read-only memory (ROM)), flash memory, or any combination or memory. System memory 604 may include operating system 605, and one or more programming modules 606. Operating system 605, for example, may be suitable for controlling computing device 600's operation. In one embodiment, programming modules 606 may include, for example, a program module 607 for executing the actions of computer/processor 500, for example. Furthermore, embodiments of the invention may be practiced in conjunction with a graphics library, other operating systems, or any other application program and is not limited to any particular application or system. This basic configuration is illustrated in FIG. 6 by those components within a dashed line 620.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by a removable storage 609 and a non-removable storage 610. Computer storage media may include volatile and nonvolatile, removable and non-removable media implemented in any method or technology for storage of information, such as computer readable instructions, data structures, program modules, or other data. System memory 604, removable storage 609, and non-removable storage 610 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 600. Any such computer storage media may be part of device 600. Computing device 600 may also have input device(s) 612 such as a keyboard, a mouse, a pen, a sound input device, a camera, a touch input device, etc. Output device(s) 614 such as a display, speakers, a printer, etc. may also be included. The aforementioned devices are only examples, and other devices may be added or substituted.

Computing device 600 may also contain a communication connection 616 that may allow device 600 to communicate with other computing devices 618, such as over a network in a distributed computing environment, for example, an intranet or the Internet. Communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 604, including operating system 605. While executing on processing unit 602, programming modules 606 (e.g. program module 607) may perform processes including, for example, one or more of the stages of the processes as described above. The aforementioned processes are examples, and processing unit 602 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A case for a mobile phone, the case comprising:
   a protective case element designed for coupling to a mobile phone with a first rechargeable battery;
   a wireless charging system embedded in the case element;
   a terminal conductively coupled with the wireless charging system, the terminal configured for conductively coupling with a power port in the mobile phone;
   an electronic cigarette element removably coupled to the case element, the electronic cigarette element comprising: a) a heating element for heating a liquid into a vapor, b) a tubular element designed to allow a user to orally inhale said vapor through said tubular element, c) a second rechargeable battery conductively coupled to the heating element, and d) a means for wirelessly charging the second rechargeable battery;
   wherein when the terminal is conductively coupled with the power port in the mobile phone, and the case element is placed in proximity to a charging station, the wireless charging system charges the first rechargeable battery of the mobile phone and the second rechargeable battery of the electronic cigarette element.

2. The case of claim 1, wherein the wireless charging system is an inductive charging system.

3. The case of claim 2, wherein the terminal is a male plug that is inserted into the power port of the mobile phone.

4. The case of claim 3, wherein the terminal is a magnetic terminal.

5. The case of claim 4, wherein the means for wirelessly charging the second rechargeable battery is an inductive charging system.

6. The case of claim 5, further comprising a magnetic element for coupling the electronic cigarette element to the case element.

7. The case of claim 1, further comprising a processor configured for routing power from the first rechargeable battery of the mobile phone to the wireless charging system embedded in the case element, so as to recharge the second rechargeable battery of the electronic cigarette element.

8. The case of claim 7, further comprising a button on the case element, wherein when depressed, the button activates the processor to route power from the first rechargeable battery of the mobile phone to the wireless charging system embedded in the case element, so as to recharge the second rechargeable battery of the electronic cigarette element.

9. A case for a mobile phone, the case comprising:
   a protective case element designed for coupling to a mobile phone with a first rechargeable battery;
   a charging system embedded in the case element;
   a terminal conductively coupled with the charging system, the terminal configured for conductively coupling with a power port in the mobile phone;
   a removable battery coupled to the case element, the removable battery conductively coupled with the wireless charging system;
   an electronic cigarette element removably coupled to the case element, the electronic cigarette element comprising: a) a heating element for heating a liquid into a vapor, b) a tubular element designed to allow a user to orally inhale said vapor through said tubular element, c) a second rechargeable battery conductively coupled to the heating element, and d) a means for charging the second rechargeable battery;
   wherein when the terminal is conductively coupled with the power port in the mobile phone, and the removable battery is coupled to the case element, the charging system uses the removable battery to charge the first rechargeable battery of the mobile phone and the second rechargeable battery of the electronic cigarette element.

10. The case of claim 9, wherein the charging system is a wireless inductive charging system.

11. The case of claim 10, wherein the terminal is a male plug that is inserted into the power port of the mobile phone.

12. The case of claim 11, wherein the terminal is a magnetic terminal.

13. The case of claim 12, wherein the means for charging the second rechargeable battery is a wireless inductive charging system.

14. The case of claim 13, further comprising a magnetic element for coupling the electronic cigarette element to the case element.

15. The case of claim 9, further comprising a processor configured for routing power from the removable battery to the charging system embedded in the case element, so as to recharge the first rechargeable battery of the mobile phone and the second rechargeable battery of the electronic cigarette element.

16. The case of claim 15, further comprising a button on the case element, wherein a position of the button activates the processor to route power from the removable battery to the charging system embedded in the case element, so as to recharge either the first rechargeable battery of the mobile phone, or the second rechargeable battery of the electronic cigarette element, or both.

17. The case of claim 16, further comprising:
   at least one coupler configured for coupling to an e-liquid cartridge.

18. The case of claim 9, wherein the tubular element is rotatably coupled to the case on one end.

* * * * *